US 6,725,290 B1

(12) United States Patent
Glover et al.

(10) Patent No.: US 6,725,290 B1
(45) Date of Patent: Apr. 20, 2004

(54) PERSISTENT MODEM CONNECTION

(75) Inventors: Kenneth Matthew Glover, Coppell, TX (US); Doug Bohls, Allen, TX (US); James He, Plano, TX (US)

(73) Assignee: Enfora, Inc., Plano, TX (US)

( * ) Notice: Subject to any disclaimer, the term of this patent is extended or adjusted under 35 U.S.C. 154(b) by 415 days.

(21) Appl. No.: 09/709,012

(22) Filed: Nov. 8, 2000

(51) Int. Cl.[7] .................................................. G06F 3/00
(52) U.S. Cl. ........................... 710/15; 710/17; 710/18; 709/227
(58) Field of Search ............................... 710/15, 17, 18; 709/227–229

(56) References Cited

U.S. PATENT DOCUMENTS

| | | | | |
|---|---|---|---|---|
| 5,546,382 A | * | 8/1996 | Fujino | 455/405 |
| 5,675,831 A | * | 10/1997 | Caputo | 710/10 |
| 5,802,304 A | * | 9/1998 | Stone | 709/227 |
| 5,815,682 A | * | 9/1998 | Williams et al. | 703/25 |
| 5,826,198 A | * | 10/1998 | Bergins et al. | 455/557 |
| 5,907,676 A | * | 5/1999 | Fujishiro et al. | 709/203 |
| 5,961,608 A | * | 10/1999 | Onosaka et al. | 709/249 |
| 6,049,892 A | * | 4/2000 | Casagrande et al. | 714/18 |
| 6,064,671 A | | 5/2000 | Killian | |
| 6,339,785 B1 | * | 1/2002 | Feigenbaum | 709/213 |
| 6,377,974 B1 | * | 4/2002 | Feigenbaum | 709/203 |

FOREIGN PATENT DOCUMENTS

| | | | | |
|---|---|---|---|---|
| WO | WO 02/47327 A2 | * | 6/2002 | H04L/12/00 |

OTHER PUBLICATIONS

John Nagle. "Simple PPP user's guide". Apr. 15, 1996. From www.animats.com/simpleppp/manual.html website.*
DNTools v2.0 description from www.simtel.net/pub/pd/7905.shtml website. Date of program file date Mar. 24, 1999 14:47:00.☐☐.*
Description of Download Accelerator Plus from www.speedbit.com webpage, copyright 1999–2003.*
Description of Connection Keeper program from www.gammadyne.com/conkeep.htm website. Printed from the Internet on Feb. 20, 2003 with program dates from 1999–2003.*

* cited by examiner

Primary Examiner—Kim Huynh
(74) Attorney, Agent, or Firm—Jackson Walker LLP; Robert C. Klinger; Raffi J. Gostanian

(57) ABSTRACT

The invention provides systems, methods, and devices that automatically create and maintain a wireless connection to a remote computer network. In one embodiment, the method creates and maintains a persistent modem connection by searching for an unconnected modem, detecting an unconnected modem; and initiating a dial-up to a computer network.

17 Claims, 2 Drawing Sheets

PERSISTENT MODEM CONNECTION

TECHNICAL FIELD OF THE INVENTION

Generally, the invention relates to computer networks and wireless computing devices, and, more particularly, the invention relates to wireless computer networks. More particularly, the invention relates to methods and devices for establishing remote connections in a wireless network.

Statement of a Problem Addressed by the Invention

As the need for portable computing power has proliferated, many persons have sought to integrate their portable computing devices with computer networks. At an office, computer networks facilitate access to computer network resources, such as widely needed data and computer programs. In addition, computer networks provide the added advantage of reducing the licensing fees associated with purchasing multiple copies of software. Furthermore, as the reliance on computer network resources has increased, users of portable computing devices have demanded ever more reliable access to those computer networks, including remote, wireless access.

Accordingly, the evolution of mobile computing platforms and operating systems has brought about a number of changes in the way that individuals use computing devices remotely (while away from a typical office setting). For example, users of portable computing devices (users) demand the ability to remotely connect to information sources like corporate networks, service providers, and the Internet. As a result, hardware and software vendors have developed products allow an individual to connect to a computer network via a number of remote devices.

For example, Microsoft has implemented the Dial-Up Networking (DUN) and Remote Access Services (RAS) architectures within their client and network operating systems, respectively. Because of Microsoft's dominance in the software market, DUN/RAS has become the de-facto standards for remote access, and DUN/RAS is implemented via a modem. Furthermore, as wireless networks have matured, they have utilized DUN/RAS architecture to gain access to networks across a number of technologies.

Unfortunately, remote access to computer networks by portable devices is not very reliable, as modem connections are prone to loosing their connection. Loosing a connection can cause frustration for a user. For example, the loss of a connection could result in an unsaved document being lost. In addition, the loss of a connection could cause an open email to be inadvertently deleted. Likewise, a connection failure could cause the loss of access to a program that has a limited network license. Furthermore, the need to physically direct a re-connection to the network is frustrating to a user.

Accordingly, it would be advantageous to provide systems, methods, and devices that provide for persistent connection of a modem device to a remote network. The disclosed invention provides such systems, methods, and devices.

Selected Overview of Selected Embodiments

The present invention achieves technical advantages as systems, methods, and devices that enable the persistent connection of a modem device to a remote network. Preferably, the invention may be incorporated in a wireless modem that is adaptable to a portable-computer's pcmcia card slot.

The method in one embodiment preferably allows a user to create and maintain a persistent modem connection. The persistent modem, in one embodiment, is implemented by searching for an unconnected modem, detecting an unconnected modem; and initiating a dial-up to a computer network.

Other embodiments include the application of a method according to the invention as computer code stored on a data storage medium, or as a data signal embodied in a data transfer medium. Furthermore, a method according to the invention may recognize revenue associated with an act providing consumer value, and thus may be exercised as a business method. Other embodiments of the invention are readily apparent to those skilled in the art and are incorporated herein, as the invention is limited only by the claims.

BRIEF DESCRIPTION OF THE DRAWINGS

Various aspects of the invention, as well as at least one embodiment of the invention, are better understood by reference to the following EXEMPLARY EMBODIMENT OF A BEST MODE. To better understand the invention, the EXEMPLARY EMBODIMENT OF A BEST MODE should be read in conjunction with the drawings, in which.

AN EXEMPLARY EMBODIMENT OF A BEST MODE

Figure 1:
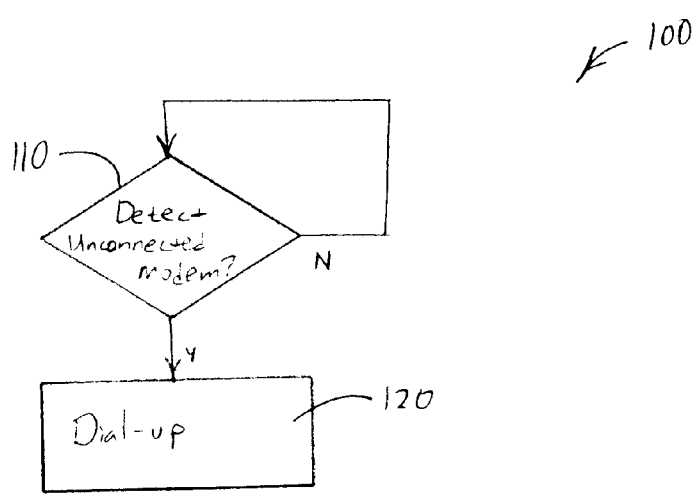
FIG. 1 illustrates a dial-up algorithm that provides a persistent modem connection.

The invention provides a system, device, and method that allows a wireless modem, such as the Spider TM modem from Nextcell TM, to automatically maintain a connection to a wireless data network. Accordingly, a user can access a computer network (network) remotely with confidence that data and files will not be lost due to modem disconnects. Furthermore, the user does not have to burden themselves with manually tasking the modem to reconnect to the remote network.

Accordingly, in one preferred embodiment, the invention executes in the background of a portable device, such as a laptop computer. The invention preserves a file maintaining the user commands made since the last user save event, and saves these changes at predetermined times. Then, when the invention detects a connection failure event, then the invention proceeds to reconnect the user to the network automatically in the background. Furthermore, the invention automatically re-creates the files with which the user is interacting.

General Guidelines

When reading this section (An Exemplary Embodiment of a Best Mode, which describes an exemplary embodiment of the best mode of the invention, hereinafter "exemplary embodiment"), one should keep in mind several points.

First, the following exemplary embodiment is what the inventors believe to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for —functioning—" in the Claims section.

Computer Systems and Software Platforms

A computer system (or, system) typically includes hardware capable of executing machine readable instructions, as well as the software for executing acts (typically machine-readable instructions) that produce a desired result. In addition, a computer system may include hybrids of hardware and software, as well as computer sub-systems.

Hardware generally includes processor-capable platforms, such as client-machines (also known as personal computers or servers), and hand-held processing devices (such as smart phones, personal digital assistants (PDAs), or personal computing devices (PCDs), for example. Furthermore, hardware typically includes any physical devices that are capable of storing machine-readable instructions, such as memory or other data storage devices. Other forms of hardware include hardware sub-systems, including transfer devices such as modems, modem cards, ports, and port cards, for example. The way hardware is organized within a system is known as the system's architecture.

Software includes machine code stored in RAM or ROM, machine code stored on other devices (such as floppy disks, or a CD ROM, for example), and may include executable code, an operating system, as well as source or object code, for example. In addition, software encompasses any set of instructions capable of being executed in a client machine or server—and, in this form, is often called a program or executable code.

Programs often execute in portions of code at a time. These portions of code are sometimes called modules or code-segments. Often, but not always, these code segments are identified by a particular function that they perform. For example, a counting module (or "counting code segment") may monitor the value of a variable. Furthermore, the execution of a code segment or module is sometimes called an act. Accordingly, software may be used to perform a method which comprises acts. In the present discussion, sometimes acts are referred to as steps to help the reader more completely understand the exemplary embodiment.

Hybrids (combinations of software and hardware) are becoming more common as devices for providing enhanced functionality and performance to computer systems. A hybrid is created when what are traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system and are thus envisioned by the invention as possible equivalent structures and equivalent methods.

Computer sub-systems are combinations of hardware or software (or hybrids) that perform some specific task. For example, one computer sub-system is a soundcard. A soundcard provides hardware connections, memory, and hardware devices for enabling sounds to be produced and recorded by a computer system. Likewise, a soundcard may also include software needed to enable a computer system to "see" the soundcard, recognize the soundcard, and drive the soundcard.

Sometimes the methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine. Other specific computer-readable mediums may be discussed and may be specific to the disclosed embodiment of the invention.

Remote Connection to Computer Networks

Computer networks are typically either circuit-switched or packet switched. In a circuit-switched network, a physical end-to-end circuit needs to be established to enable data transmission. In a Windows TM system, this is typically accomplished buy using DUN in the client to communicate with a RAS server. The connection is very similar to a landline modem connection, such as that used by America Online TM's modem system, where a phone number is dialed to establish a connection. Accordingly, in circuit-switched systems, the operating system will treat the connection just like any other modem definition for remote access.

An alternative computer network design that is becoming popular is packet switching, implemented through a packet switched architecture. In a packet switched architecture, a connection to a wireless network is established first. Then packets are sent to the wireless network for routing to the target (or ultimate) network. Accordingly, data packets, which are typically Internet Protocol (IP) based data packets, are passed through the wireless network to the ultimate network for processing.

To provide a connection to either a circuit switched network or a packet switched network, a modem can be used. Protocols are used to provide an interface between a modem and a operating system of a portable device. These protocols establish a connection between a modem and the portable device, and use the modem to provide a conduit for the traversal of data packets to the network.

Serial Line Internet Protocol (SLIP) and Point To Point Protocol (PPP) are the most common protocols implemented to facilitate the connection between the modem and the portable device. Accordingly, SLIP and PPP provide a standard connection definition that most every computer operating system supports, however, the invention should not be read to be limited to SLIP or PPP protocols, as these are exemplary protocols.

Often, a protocol is implemented in firmware (software programmed or burnt into hardware) on a modem. Then, the portable device uses the standard definition process defined by the protocol to setup the connection.

The Microsoft Network Device Interface Standard (NDIS) was developed to provide a standard (uniform) interface for different networks. To provide a uniform interface, the NDIS standard provides a layer of abstraction for a portable device such that the specifics of the physical network layers can be designed, altered, and developed to be visible to the operating system as a common network interface.

Modem Versus Network Interface Card (NIC)

A modem in a portable device can be defined as either a modem or as a network interface card. There are a number of differences between a modem definition (hereinafter, modem) and a definition for a NIC (hereinafter NIC, or network adapter). The most significant difference is how each handles a network connection when a host platform goes into a "suspend mode". In a network based on WindowsTM, most modems use Dial-Up Networking to establish a connection. When a connection is interrupted or fails on most of these modems, the host system suspends and the connection is severed. Upon coming out of the suspend mode, a user must manually re-establish the connection.

Another difference between a modem and a NIC is the power consumption required to keep each connection maintained while the host platform is in suspend mode. A NIC requires some amount of power to be applied to the NIC device to maintain the connection. With a modem, power is used only when the modem is actually connected to the network. Thus, when the host system suspends, the dial-up session is disconnected. Accordingly, no power is applied to the modem to maintain a connection.

Exemplary Method of Practicing the Invention

The invention allows a user the ability to choose between placing a modem in a manual mode (which operate as a modem), and placing the modem in a persistent connection mode (which emulates a NIC connection). If the user selects manual mode, then the modem operates as a typical modem, requiring the user to manually direct the modem to dial-up. When a user selects the persistent connection mode, the user initiates an automated process that monitors the modem (such as a modem secured in a PC Card Slot) for a connection status, and implements a dial-up if the modem is not connected. The modem is preferable a modem capable of wireless communication with a network. More preferably still, the modem is a cellular digital packet data (CDPD) modem capable of push-based technology data transfers, such as the Spider ModemTM from NextcellTM. The modem may be selected to be a data-only CDPD push modem, and may also be a modem that is attachable to a portable device through a PC Card Slot.

To help illustrate a procedure for implementing the persistent connection mode, FIG. 1 illustrates a dial-up algorithm 100 that provides a persistent modem connection. The dial-up algorithm 100 begins with a detect unconnected modem query 110. The detect unconnected modem query 110 monitors a modem or modems in the portable computing device (or other computer) to determine if the modem is connected. If the modem is connected to a network, then the dial-up algorithm 100 continues to monitor the modem. This is illustrated in FIG. 1 as the no "N" decision, where a continuation loop feeds directly back to the detect unconnected modem query 110.

Figure 2:
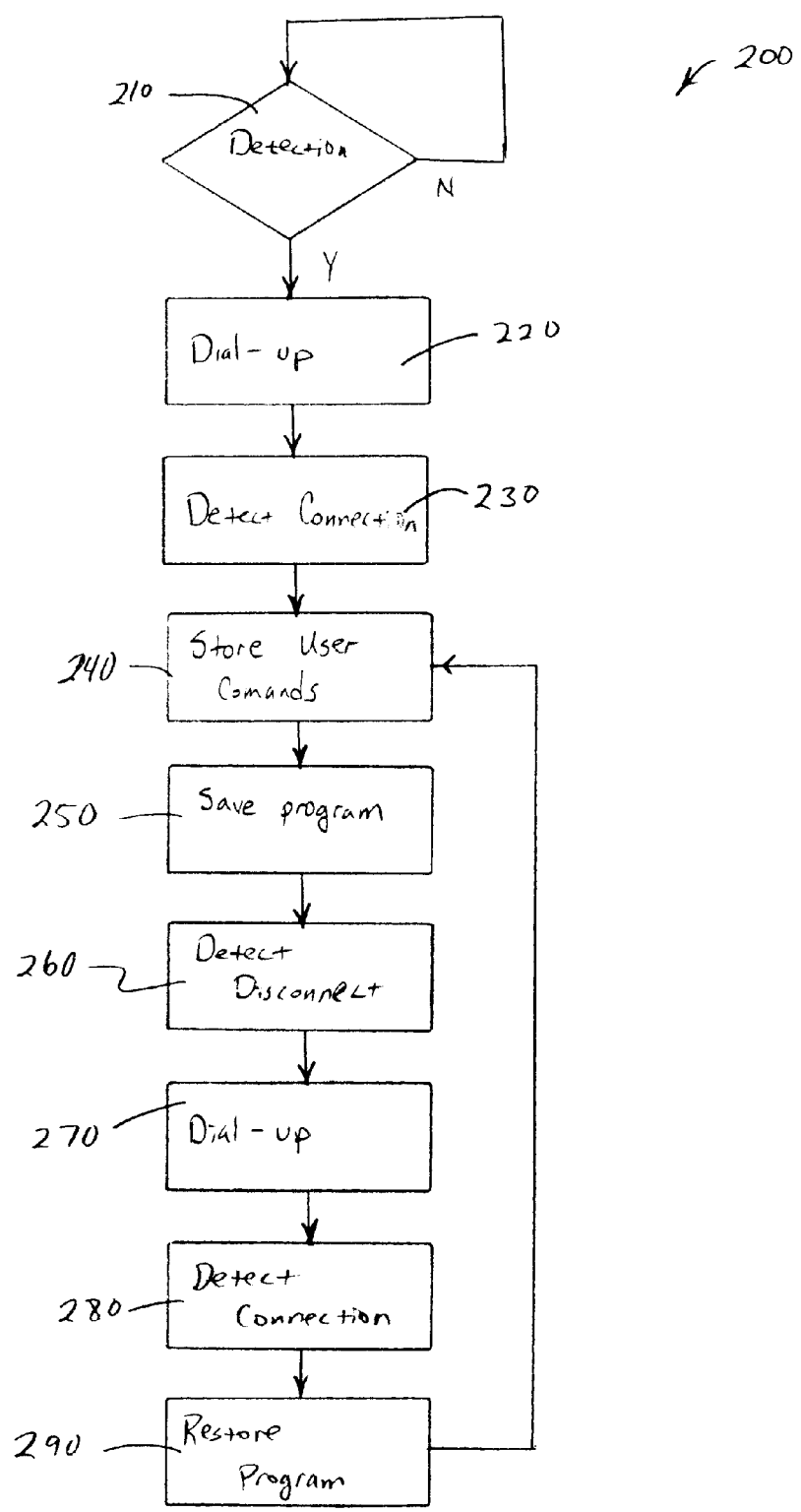
FIG. 2 provides a block flow diagram of a persistent connection algorithm that provides enhanced functionality to a persistent modem connection.

If the detect unconnected modem query 110 detects a modem, then the dial-up algorithm 100 proceeds to a dial-up act 120. The dial-up act 120 automatically initiates and runs a dial-up entry (meaning a small computer program, a modem device driver, or predefined algorithm) appropriate for the operating system that supports the modem, such as a Windows operating system or a Macintosh operating system, for example. Accordingly, in the dial-up act 120 the modem is connected to a network, which is preferably a wireless network. Ideally this connection is maintained, however, sometimes, the connection may fail, due to a network interruption, a server stand-down, or a communication failure, for example. Furthermore, sometimes additional functionality beyond that supplied by a pure persistent connection is desired. Accordingly, FIG. 2 provides a block flow diagram of a persistent connection algorithm 200 which provides enhanced functionality to a persistent modem connection.

The persistent connection algorithm 200 begins in response to a user selection of a persistent connection, and preferably runs in the background of a portable computing device. Of course, it should be understood that the persistent connection algorithm 200 can be configured, such as in the autoexe.bat file, to run immediately upon the boot-up of the portable computing device. Prior to the establishment of a persistent modem connection (particularly the first time the modem connection is being established), the persistent connection algorithm 200 may request from a user information such as an IP address to access, a carrier preference, a DNS, or other diagnostic information.

Typically, the persistent connection algorithm 200 begins by performing a detection query 210. In the detection query 210 the persistent connection algorithm 200 seeks to detect a modem, such as a cellular digital packet data (CDPD) modem, and then determines if the modem is connected to a network. If the detection query 210 detects that the modem is connected to a network, the detection query repeats, as illustrated in FIG. 2 by the no "N" decision and the loop back to the detection query 210. If the detection query 210 does detect a modem that is not connected to a network (an unconnected modem), the persistent connection algorithm 200 proceeds to establish a connection in a dial-up act 220, as illustrated by the yes "Y" decision.

In the dial-up act 220 the persistent connection algorithm 200 initiates the dial-up entry needed to cause the modem to connect to the network. Then, when the modem connects to the network, the persistent connection algorithm 200 detects the connection event in a detect connection act 230. As the portable computing device connects to (and maintains the connection to) the network, the persistent connection algorithm 200 may provide information to the portable computing device that is displayable for a user. For example, the persistent connection algorithm 200 may report information about the modem, such as an indication that the modem is recognized, and indication that the modem is registered on a network, the network type, a network data transfer rate, or an indication that the modem can ping a DNS, for example.

Following the establishment of a connection with the network, the portable computing device access data or programs available on the network, and the user typically begins to interact with the data or the programs. Accordingly, to insure that the user does not loose access to data retrieved from the network, and to insure that the user does not loose any changes made to programs utilized via the network, the persistent connection algorithm 200 tracks and stores user commands in a store user command act 240. For example, the store user command act can track and store mouse movements, keyboard entries, or other user acts. Furthermore, as data and programs reach storable stages, or at predetermined time intervals, such as every thirty seconds, the persistent connection algorithm 200 may save the data or program in a save program act 250.

Persistent connection algorithm 200 may detect a disconnect event, such as a connection failure, in a detect disconnect event act 260. For example, in the detect disconnect event act 260, the persistent connection algorithm 200 may detect that the server has gone into a suspend mode. In response to a detected disconnect event, the persistent connection algorithm 200 initiates a dial-up act 270. Once a dial up connection has been reestablished in the dial-up act 270, the persistent connection algorithm 200 detects the reconnection in a second detect connection act 280.

In response to the connection being reestablished, the persistent connection algorithm 200 may restore a program or programs the user was using prior to the disconnection in a restore program act 290. Accordingly, in the restore program act 290 the persistent connection algorithm retrieves a program in the form it was last saved (in the save program act 250), and then proceeds to regenerate the user commands that were stored in the store user command act 240 (the user commands executed are only those that are not reflected in the save program act 250). Then, once the program has been restored by the restore program act 290, persistent connection algorithm 200 returns to the store user command act 240.

Though the invention has been described with respect to a specific exemplary embodiment, many variations and modifications will become apparent to those skilled in the art upon reading the present application. It is therefore the intention that the following claims be interpreted as broadly as possible in view of the prior art to include all such variations and modifications.

What is claimed is:

1. A method for establishing a persistent modem connection, comprising:
   searching for a single unconnected wireless modem;
   detecting the single unconnected wireless modem; and
   automatically initiating and running a dial-up to a single network for the single unconnected wireless modem regardless of whether an attempt to communicate with the network is detected;
   wherein the automatic initiating and running occurs based on at least one of a following event from a group consisting of:
      an initial availability of the single unconnected wireless modem; and
      a disconnection of the single unconnected wireless modem from the single network after the wireless modem has been connected, wherein the disconnection is unintentional and may occur during a data transfer.

2. The method of claim 1 wherein the network is a wireless network.

3. The method of claim 1 wherein the wireless modem is adapted to be coupled to a portable computing device.

4. The method of claim 1 wherein the automatic initiating runs a dial-up entry for an operating system.

5. The method of claim 1 further comprising monitoring a PC Card Slot for a modem.

6. The method of claim 1 further comprising receiving an indication that indicates the modem should operate as a persistent modem connection.

7. The method of claim 1 wherein the method runs in the background.

8. The method of claim 1 further comprising requesting a user to enter an IP address.

9. The method of claim 1 further comprising detecting a connection to a computer network.

10. The method of claim 1 further comprising storing a user command.

11. The method of claim 1 further comprising saving a program.

12. The method of claim 1 further comprising detecting the disconnection of the wireless modem.

13. The method of claim 1 further comprising restoring a program at a point prior to the disconnection of the wireless modem.

14. The method of claim 1 further comprising reporting a modem status for display.

15. A data storage medium having thereon a means for establishing a persistent modem connection, comprising:
   means for searching for a single unconnected wireless modem;
   means for detecting the unconnected wireless modem; and
   means for automatically initiating a dial up to a single network for the unconnected wireless regardless of whether an attempt to communicate with the network is detected modem;
   wherein the means for initiating occurs based on at least one of a following event from a group consisting of:
      an initial availability of the unconnected wireless modem; and
      a disconnection of the unconnected wireless modem from the single network after the wireless modem has been connected, wherein the disconnection is unintentional and may occur during a data transfer.

16. A computer readable medium comprising instructions for:
   searching for a single unconnected wireless modem;
   detecting the unconnected wireless modem;
   automatically dialing-up to a single network for the unconnected wireless modem regardless of whether an attempt to communicate with the network is detected;
   automatically connecting the unconnected wireless modem to the network;
   detecting a disconnect of the connected wireless modem from the network;
   automatically dialing-up to the single network for the disconnected wireless modem; and
   automatically connecting the disconnected wireless modem to the network;
   wherein the disconnect is unintentional and may occur during a data transfer; and
   wherein the unconnected modem and the disconnected wireless modem are a same modem.

17. A method for restoring a program, comprising:
   searching for a single unconnected wireless modem;
   detecting the unconnected wireless modem;

automatically dialing-up to a single network for the unconnected wireless modem regardless of whether an attempt to communicate with the network is detected;

automatically connecting the unconnected wireless modem to the network;

detecting a disconnect of the connected wireless modem from the network, wherein the disconnect is unintentional and may occur during a data transfer;

automatically dialing-up to the network for the disconnected wireless modem;

automatically connecting the disconnected wireless modem to the network; and restoring a program in use during the disconnect detection, the restoring comprising:

retrieving the program in a form it was last saved; and regenerating stored user commands related to the program.

* * * * *